(12) United States Patent
Park

(10) Patent No.: US 12,473,686 B2
(45) Date of Patent: Nov. 18, 2025

(54) METHOD FOR CONTROLLING LAUNDRY MANAGEMENT APPARATUS

(71) Applicant: LG Electronics Inc., Seoul (KR)

(72) Inventor: Yonghun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/383,649

(22) Filed: Oct. 25, 2023

(65) Prior Publication Data

US 2024/0052551 A1    Feb. 15, 2024

Related U.S. Application Data

(63) Continuation of application No. 17/179,782, filed on Feb. 19, 2021, now Pat. No. 11,828,019.

(30) Foreign Application Priority Data

Feb. 21, 2020    (KR) .................. 10-2020-0021775

(51) Int. Cl.
*D06F 58/45* (2020.01)
*D06F 34/05* (2020.01)

(52) U.S. Cl.
CPC .............. *D06F 58/45* (2020.02); *D06F 34/05* (2020.02)

(58) Field of Classification Search
None
See application file for complete search history.

(56) References Cited

U.S. PATENT DOCUMENTS

| | | | | |
|---|---|---|---|---|
| 2008/0053164 | A1* | 3/2008 | Park | D06F 29/005 68/13 R |
| 2010/0101606 | A1* | 4/2010 | Grunert | D06F 58/22 68/28 |
| 2015/0020556 | A1* | 1/2015 | Kim | D06F 29/005 68/20 |
| 2020/0370226 | A1* | 11/2020 | Scheible | D06F 58/24 |

FOREIGN PATENT DOCUMENTS

| | | |
|---|---|---|
| CN | 102428226 | 4/2012 |
| CN | 106637798 | 5/2017 |
| CN | 109023838 | 12/2018 |
| CN | 109862104 | 6/2019 |
| JP | 3314144 | 8/2002 |
| JP | 2020-022647 | 2/2020 |
| KR | 100652459 | 12/2006 |
| KR | 100774211 | 11/2007 |
| KR | 10-20170085915 | 7/2017 |
| KR | 10-20180111000 | 10/2018 |

OTHER PUBLICATIONS

Extended European Search Report in European Appln. No. 21157620.2, dated Jul. 2, 2021, 9 pages.
Notice of Allowance in Korean Appln. No. 10-2020-0021775, dated Oct. 23, 2022, 3 pages (with English translation).
Office Action in Chinese Appln. No. 202110191463.0, dated Jul. 15, 2022, 11 pages (with English translation).

* cited by examiner

*Primary Examiner* — Kaj K Olsen
*Assistant Examiner* — Pradhuman Parihar
(74) *Attorney, Agent, or Firm* — Fish & Richardson P.C.

(57) ABSTRACT

A method for controlling a laundry management apparatus comprising a washing unit and a drying unit that are operated by a single operation unit and remotely controlled to manage hygiene of the drying unit, is provided.

17 Claims, 13 Drawing Sheets

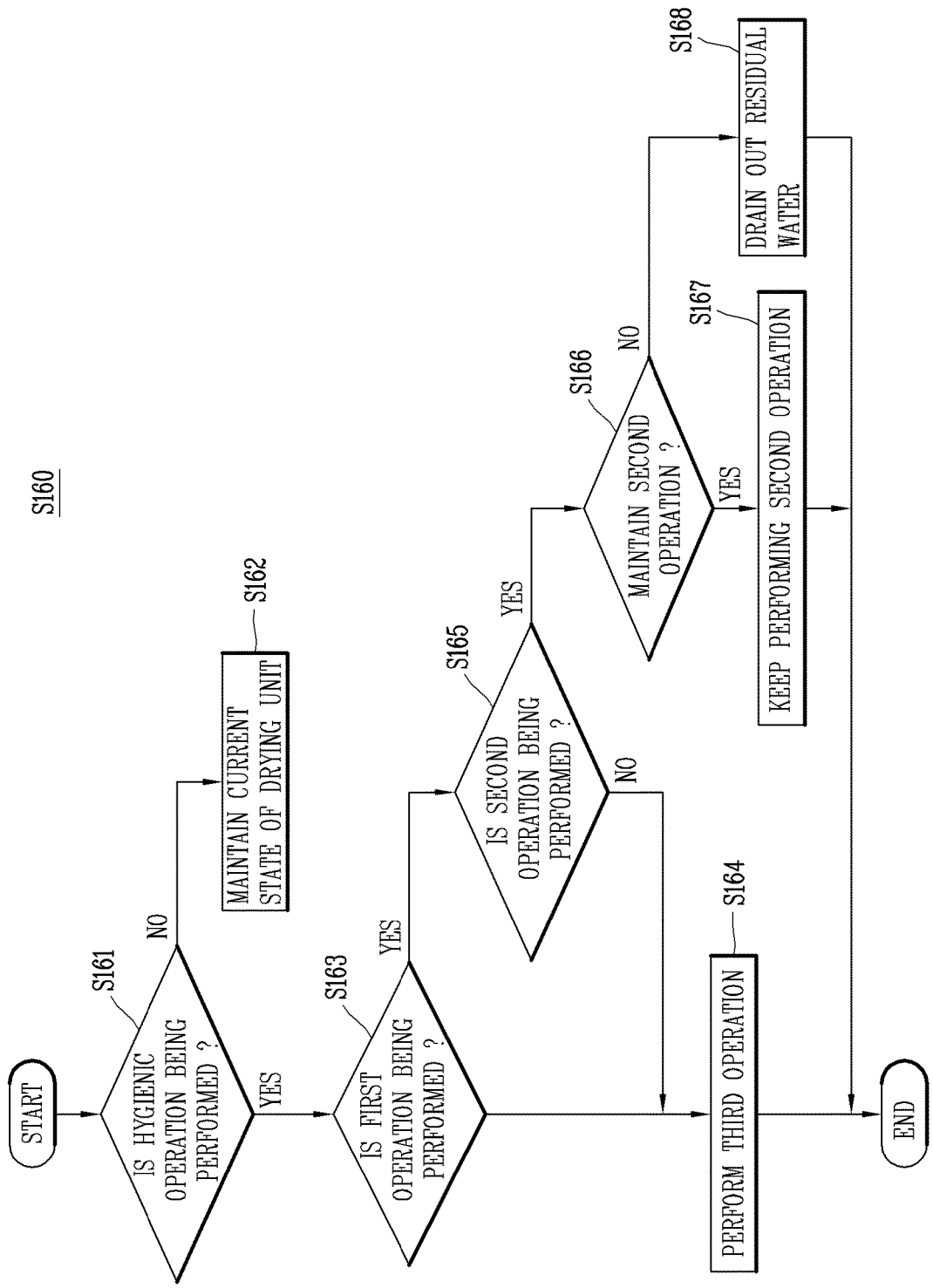

METHOD FOR CONTROLLING LAUNDRY MANAGEMENT APPARATUS

CROSS-REFERENCE TO RELATED APPLICATION

This application is a continuation of U.S. application Ser. No. 17/179,782, filed on Feb. 19, 2021, which claims the benefit pursuant to 35 U.S.C. § 119(a) of the earlier filing date and the right of priority to Korean Patent Application No. 10-2020-0021775, filed on Feb. 21, 2020, the contents of which is incorporated by reference herein in their entirety.

BACKGROUND

1. Technical Field

The implementation relates to a method for controlling a laundry management apparatus that manages laundry.

2. Description of the Related Art

Recently, a laundry management apparatus in which a dryer and a washing machine are integrally equipped has been developed. Since the washing machine and the dryer can share data, information on washing and drying-related operations is shared.

A washing machine is an apparatus for washing laundry by performing washing, rinsing, and spinning operations according to a set algorithm. Washing machines are classified into a pulsator type, an agitation type, and a drum type according to a washing method.

A dryer is an apparatus for drying wet laundry after washing. Dryers are classified into a dehumidifying type and an exhaust type according to a drying method.

In the process of drying wet laundry in the dryer, foreign substances such as dust or lint may be generated from the laundry and accumulated in a drying drum or condenser, and bacteria may grow due to moisture generated as the laundry is dried. These foreign substances and bacteria may cause contamination of the laundry during drying.

For this reason, the dryer has a function for removing such foreign substances and bacteria. However, the function is not executed automatically but is executed by a user's selection. If the user forgets to execute the function or is not well aware of using the function, hygiene management of the dryer is failed.

SUMMARY

The present disclosure aims to overcome those problems and other drawbacks of the related art.

Specifically, one aspect of the present disclosure is to provide a method for controlling a laundry management apparatus capable of automatically performing hygiene management of a drying unit whenever a washing unit is operated, through a single setting.

Another aspect of the present disclosure is to provide a method for controlling a laundry management apparatus capable of using a drying unit immediately after completing washing by setting a hygiene operation to be completed earlier than a washing operation.

To achieve those aspects and other advantages disclosed herein, a method for managing a laundry management apparatus according to an implementation may be configured to automatically activate a hygiene management mode of a drying unit while a washing unit is operated, by setting the hygiene management mode of the drying unit according to an external signal.

In order to achieve these and other advantages and in accordance with the purpose of this specification, as embodied and broadly described herein, there is provided a method for controlling a laundry management apparatus including a washing unit and a drying unit, which are operated by a single operation unit and remotely controlled by an external signal to manage hygiene of the drying unit. The method may include setting a hygiene management mode of the drying unit according to the external signal, selecting synchronization or non-synchronization of a completion time between a washing operation of the washing unit and a hygienic operation of the drying unit according to the external signal, activating a control module of the drying unit and interoperably connecting the washing unit with the drying unit when power is applied to the washing unit, performing, by the drying unit, the hygienic operation corresponding to a first scenario or a second scenario according to a result of the selection, and performing, by the drying unit, a plurality of actions corresponding to a plurality of unexpected situations when the plurality of unexpected situations occurs in the washing unit.

The hygienic operation may be an operation of sterilizing and washing the drying unit. The first scenario may be that the drying unit performs the hygienic operation when the synchronization is selected, and the second scenario may be that the drying unit performs the hygienic operation when the non-synchronization is selected.

In an implementation, the performing, by the drying unit, the hygienic operation may include comparing a first operation time of the washing operation with a second operation time of the hygienic operation, and outputting a notification for completion of the hygienic operation after performing the hygienic operation when the second operation time is shorter than the first operation time.

In an implementation, the performing, by the drying unit, the hygienic operation may further include determining a result of the selection when the first operation time is shorter than the second operation time, setting the first operation time to be equal to or longer than the second operation time when the synchronization is selected, and transmitting the first operation time to the drying unit.

In an implementation, the performing, by the drying unit, the hygienic operation may further include outputting a notification for re-selecting the synchronization or the non-synchronization with respect to the first operation time and the second operation time when the non-synchronization is selected, activating the first scenario when the synchronization is re-selected, and activating the second scenario when the non-synchronization is re-selected.

In an implementation, the performing, by the drying unit, the hygienic operation may further include after the transmission of the first operation time to the drying unit, detecting laundry introduced into the drying unit, outputting information related to the detection of the laundry as a notification when the laundry is detected, outputting a notification for selecting whether to perform a drying operation of the drying unit for the laundry, and performing the drying operation when it is selected to perform the drying operation. The drying operation may be an operation of drying the laundry.

In an implementation, the performing, by the drying unit, the hygienic operation may further include outputting guide information regarding whether to proceed with the hygiene management mode as the notification when it is selected not to perform the drying operation.

In an implementation, the performing, by the drying unit, the hygienic operation may further include performing the hygienic operation corresponding to the first scenario or the second scenario according to a result of the re-selection of the synchronization or the non-synchronization when the laundry is not detected.

In an implementation, the performing the hygienic operation corresponding to the first scenario or the second scenario may further include outputting progress information related to the hygienic operation according to the second scenario as a notification when performing the hygienic operation corresponding to the second scenario.

In an implementation, the performing, by the drying unit, the plurality of actions may include determining whether the drying unit is performing the hygienic operation when a failure occurs in the washing unit in operation, and maintaining a current state of the drying unit when it is determined that the hygienic operation is not being performed.

In an implementation, the performing, by the drying unit, the plurality of actions may further include determining whether the drying unit is performing a first operation included in the hygienic operation when it is determined that the hygienic operation is being performed, and performing, by the drying unit, a third operation included in the hygienic operation after completing the first operation when it is determined that the first operation is being performed.

In an implementation, the performing, by the drying unit, the plurality of actions may further include determining whether the drying unit is performing a second operation included in the hygienic operation when it is determined that the first operation is not being performed.

In an implementation, the first operation may be an operation of sterilizing an inside of a drum of the drying unit into which laundry is introduced, the second operation may be an operation of drying a condenser, and the third operation may be an operation of washing the condenser.

In an implementation, the performing, by the drying unit, the plurality of actions may further include performing the third operation when it is determined that the second operation is not being performed.

In an implementation, the performing, by the drying unit, the plurality of actions may further include outputting a notification for selecting whether to keep performing the second operation when it is determined that the second operation is being performed, and keeping performing the second operation until the second operation is completed when it is selected to keep performing the second operation.

In an implementation, the performing, by the drying unit, the plurality of actions may further include keeping performing the second operation until the second operation is completed when it is selected to keep performing the second operation, or completing the second operation and draining residual water within the washing unit when it is determined not to keep performing the second operation.

In an implementation, the interoperably connecting the washing unit with the drying unit may include determining whether the drying unit is a first type or a second type, and interoperably connecting the washing unit with the drying unit according to a result of the determination.

The first type may be a type in which the drying unit is switched from an active state to a power-saving state when a predetermined time elapses after power is applied to the drying unit, and the second type may be a type in which the drying unit is maintained in the active state after power is applied to the drying unit.

In an implementation, the interoperably connecting the washing unit with the drying unit may further include determining whether the drying unit is in the power-saving state when it is determined that the drying unit is the first type, and switching the drying unit to the active state when it is determined that the drying unit is in the power-saving state.

In an implementation, the interoperably connecting the washing unit with the drying unit may be configured to interoperably connect the washing unit with the drying unit when it is determined that the drying unit is not in the power-saving state.

In an implementation, the interoperably connecting the washing unit with the drying unit may be configured to interoperably connect the washing unit with the drying unit when it is determined that the drying unit is the second type.

In an implementation, the drying unit may be maintained in the hygiene management mode until the hygiene management mode according to the external signal after the hygiene management mode is set according to the external signal.

In a method for controlling a laundry management apparatus according to an implementation, a drying unit can automatically perform a hygiene management mode whenever a washing unit is operated, through a single setting, thereby enabling an efficient hygiene management for the drying unit.

In addition, a hygienic operation of the drying unit can be set to be completed earlier than a washing operation of the washing unit, thereby suppressing a delay in using the drying unit after completion of washing.

BRIEF DESCRIPTION OF THE DRAWINGS

FIG. 13 is a flowchart illustrating a process of performing a plurality of actions illustrated in FIG. 4.

DETAILED DESCRIPTION

Description will now be given in detail of a laundry management apparatus and a method for controlling the same according to preferred implementations disclosed herein, with reference to the accompanying drawings. For the sake of brief description with reference to the drawings, the same or equivalent components may be provided with the same or similar reference numbers, and description thereof will not be repeated.

In describing the present disclosure, if a detailed explanation for a related known function or construction is considered to unnecessarily divert the gist of the present disclosure, such explanation has been omitted but would be understood by those skilled in the art. It should be noted that the attached drawings are provided to facilitate understanding of the implementations disclosed in this specification, and should not be construed as limiting the technical idea disclosed in this specification by the attached drawings.

Figure 1:
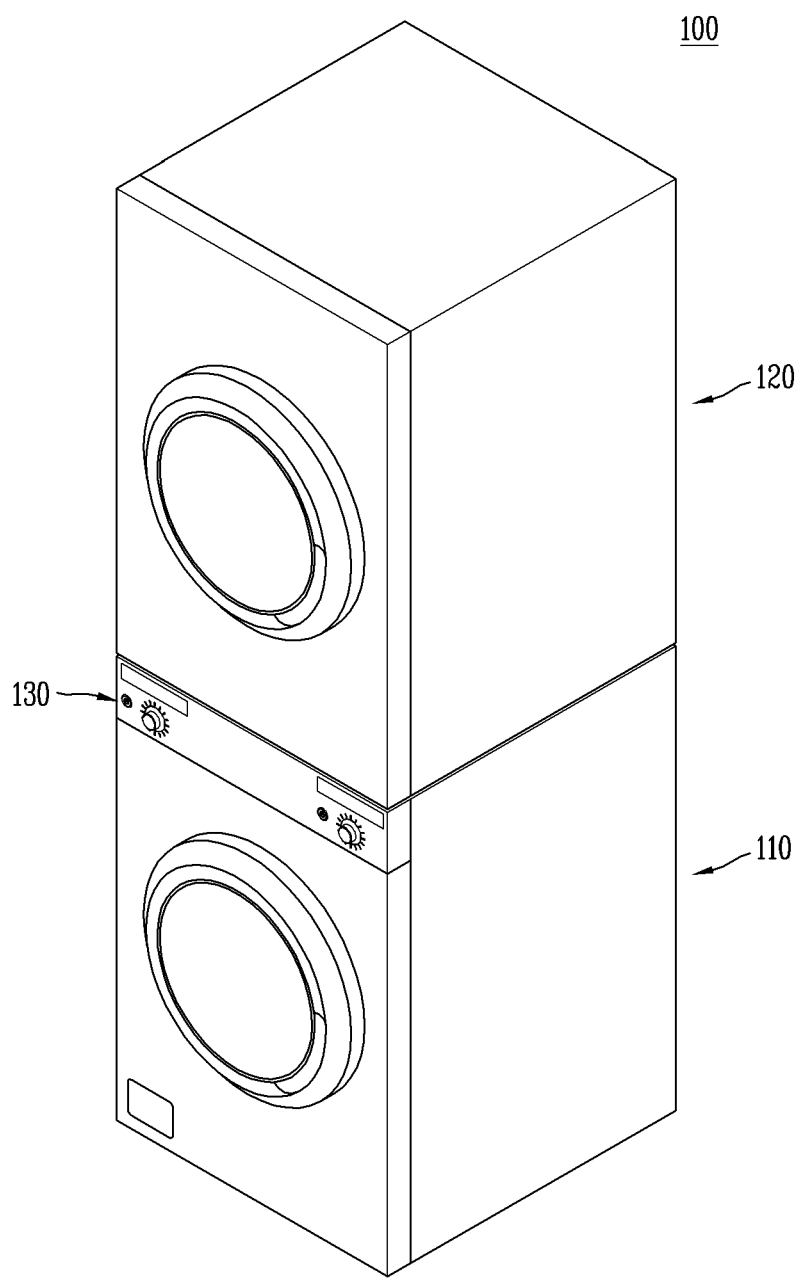
FIG. 1 is a perspective view illustrating a laundry management apparatus in accordance with an implementation.
Figure 2:
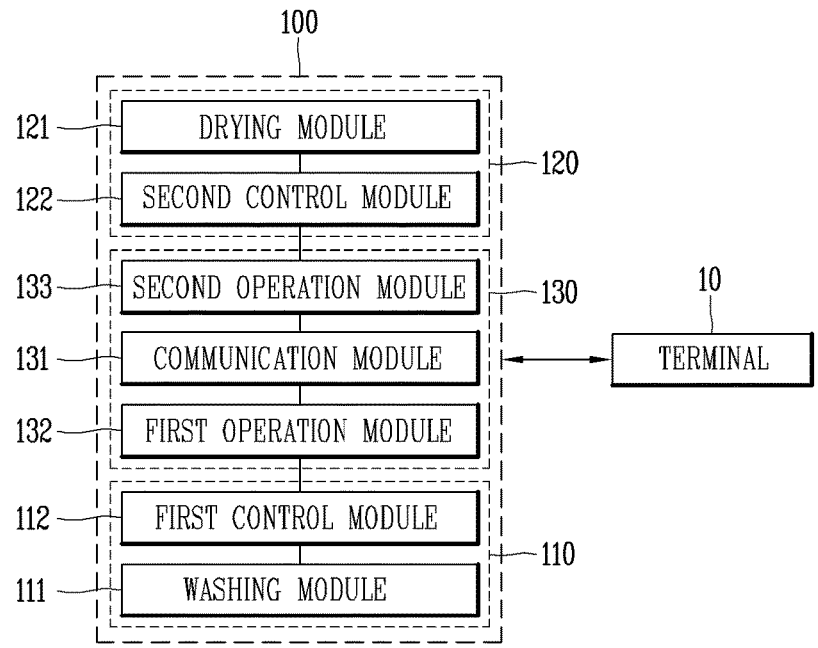
FIG. 2 is a conceptual view of the laundry management apparatus illustrated in FIG. 1.

Hereinafter, a laundry management apparatus according to an implementation will be described with reference to FIGS. 1 to 3.

A laundry management apparatus 100 according to an implementation may include a washing unit 110 and a drying unit 120. The washing unit 110 and the drying unit 120 may be operated by a single operation unit 130. When the operation of the washing unit 110 is remotely controlled using an external signal, the hygiene of the drying unit 120 may automatically be managed.

Here, the external signal may be a signal received through a terminal 10. The terminal 10 may be any device that has an application installed therein to access to the laundry management apparatus 100, includes a display sensitive to touch, and can perform wireless communication.

The washing unit 110 may include a washing module 111 and a first control module 112. The washing module 111 may perform an operation of washing laundry or clothes, and the first control module 112 may transmit a first control signal received from the operation unit 130 to the washing module 111 so as to control the operation of the washing module 111.

The drying unit 120 may include a drying module 121 and a second control module 122. The drying module 121 may perform an operation of drying wet laundry that has been washed in the washing module 111, and the second control module 122 may receive a second operation signal from the operation unit 130 to control the operation of the drying module 121.

The operation unit 130 may include a communication module 131, a first operation module 132, and a second operation module 133. The communication module 131 may receive an external signal from the terminal 10. The first operation module 132 may generate a first operation signal for operating the washing module 111 according to an external signal, and transmit the generated first operation signal to the first control module 112. In addition, the second operation module 133 may generate the second operation signal for operating the drying module 121 according to an external signal, and transmit it to the second control module 122.

Figure 3:
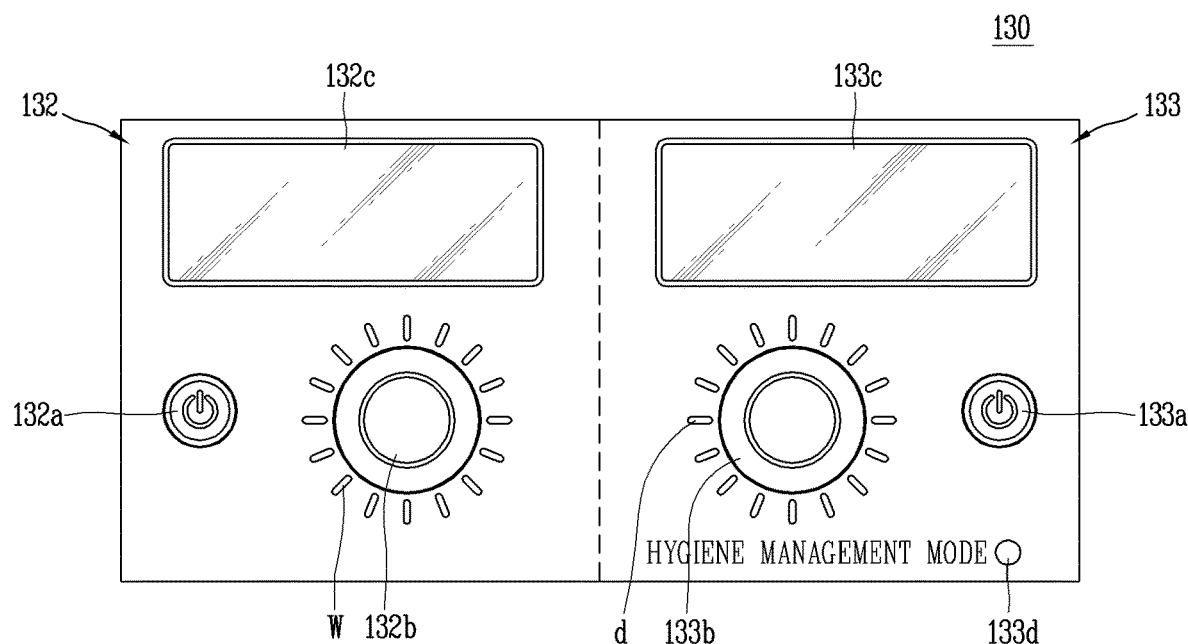
FIG. 3 is an exemplary view of an operation unit illustrated in FIG. 1.

FIG. 3 illustrates an example of the operation unit 130 provided in the laundry management apparatus 100. The operation unit 130 may include a first operation module 132 for manipulating the washing unit 110, and a second operation module 132 for manipulating the drying unit 120.

The first operation module 132 may include a power supply 132a, a washing operation selection part 132b, and a first display 132c. The power supply 132a may apply power to the washing unit 110. The washing operation selection part 132b may select any one of a plurality of washing operations w that the washing unit 110 can perform or select a washing course. In addition, the first display 132c may output information related to a washing operation which is being performed by the washing unit 110.

The second operation module 133 may include a power supply 133a, a drying operation selection part 133b, a second display 133c, and a hygiene management mode notification light-emitting diode (LED) 133d. The power supply 133a may apply power to the drying unit 120. The drying operation selection part 133b may select any one of a plurality of drying operations d that the drying unit 120 can perform or select a drying course. In addition, the second display 133c may output information related to a drying operation d which is being performed by the drying unit 120. The hygiene management mode notification LED 133d may be turned on when a hygiene management mode is set on the drying unit 120 by an external signal.

The operation unit 130 provided in the laundry management apparatus 100 is not limited to FIG. 3 and may include all operation keys capable of operating the washing unit 110 and the drying unit 120.

Figure 4:
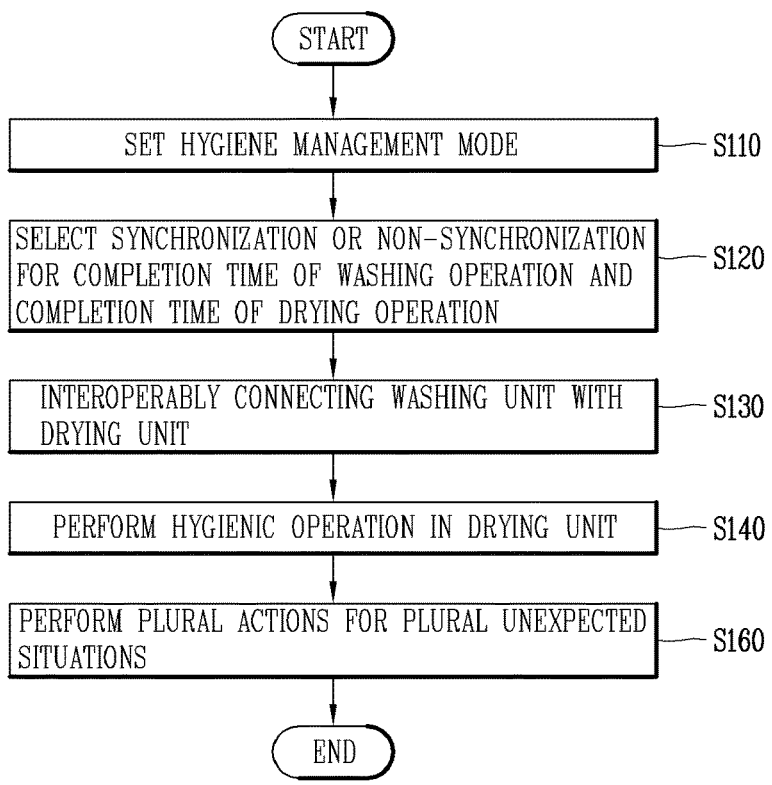
FIG. 4 is a flowchart illustrating a method for controlling a laundry management apparatus in accordance with an implementation.

Hereinafter, a method for controlling a laundry management apparatus according to an implementation will be described with reference to FIG. 4.

A method for controlling a laundry management apparatus according to an implementation may be a method that is configured to control a pretreatment operation for hygiene management of a condenser and an inside of a drum of the drying unit 120 to be completed at the same time or earlier than when the operation of the washing unit 110 is completed, such that the drying unit 120 can be used immediately after the completion of the washing operation in the washing unit 110.

In the method for controlling the laundry management apparatus according to the implementation, a hygiene management mode of the drying unit 120 may be set by an external signal (S110).

Here, the hygiene management mode may be set to perform an operation of automatically washing and drying the condenser of the drying unit 120 while the washing unit 110 performs a washing operation, and an operation of sterilizing and drying the inside of the drum into which the laundry is introduced.

Hereinafter, the step S110 will be described in more detail with reference to FIG. 5. When an application installed in the terminal 10 is executed, a plurality of operation keys for controlling the operations of the washing unit 110 and the drying unit 120 may appear. The hygiene management mode may be set by pressing a 'Hygiene management mode ON' key among the plurality of operation keys. In addition, the hygiene management mode is an optional function. Once set, the hygiene management mode may be maintained until a 'Hygiene management mode OFF' key is pressed.

Then, synchronization or non-synchronization of a completion time between the washing operation of the washing unit 110 and the hygienic operation of the drying unit 120 may be selected according to an external signal (S120).

Hereinafter, the step S120 will be described in more detail with reference to FIG. 6. When the 'Hygiene management mode ON' key is pressed in FIG. 5, a notification for selecting synchronization or non-synchronization may be output to the terminal 10 as illustrated in FIG. 6. Thus, a user may select either the synchronization or the non-synchronization.

Figure 5:
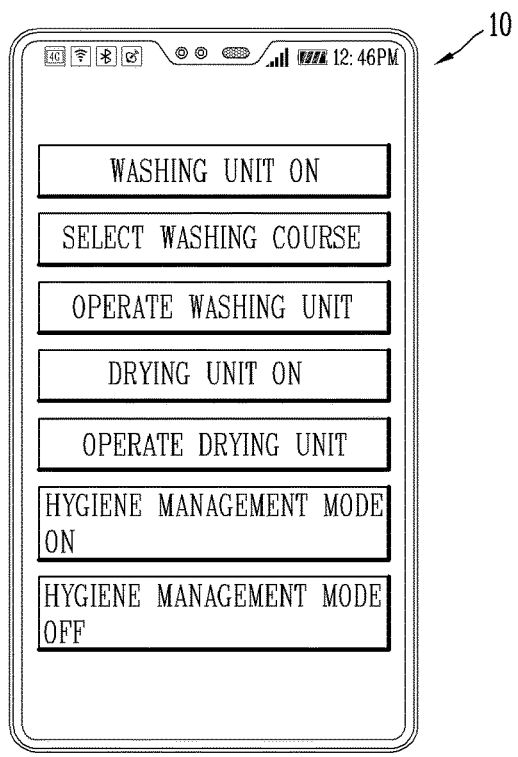
FIG. 5 is an exemplary view illustrating a process of selecting a hygiene management mode in accordance with an implementation.
Figure 6:
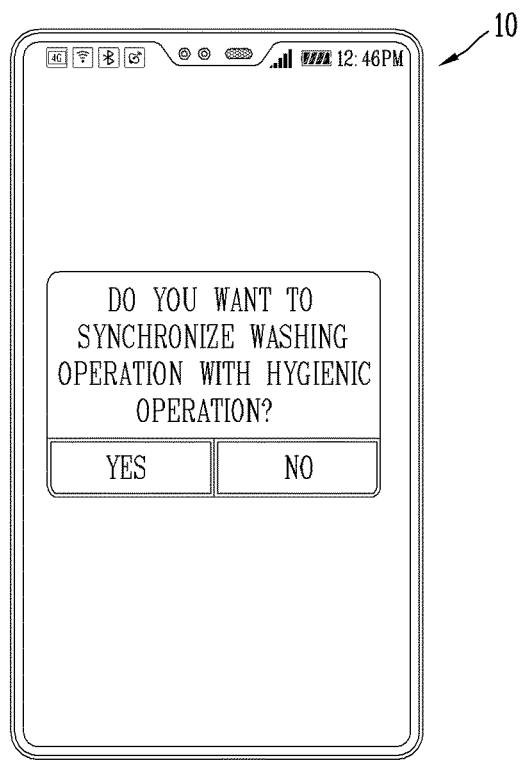
FIG. 6 is an exemplary view illustrating a process of selecting synchronization or non-synchronization between a washing operation and a hygienic operation in accordance with an implementation.

Additionally, the synchronization or non-synchronization selected in step S120 may be maintained until the 'Hygiene management mode OFF' of FIG. 5 is pressed, or may be selected whenever the hygiene management mode is activated as the washing unit 110 performs the washing operation.

Thereafter, when the washing unit 110 is turned on, the second control module 122 of the drying unit 120 may be activated, so that the washing unit 110 and the drying unit 120 are interoperably connected with each other (S130).

Figure 7:
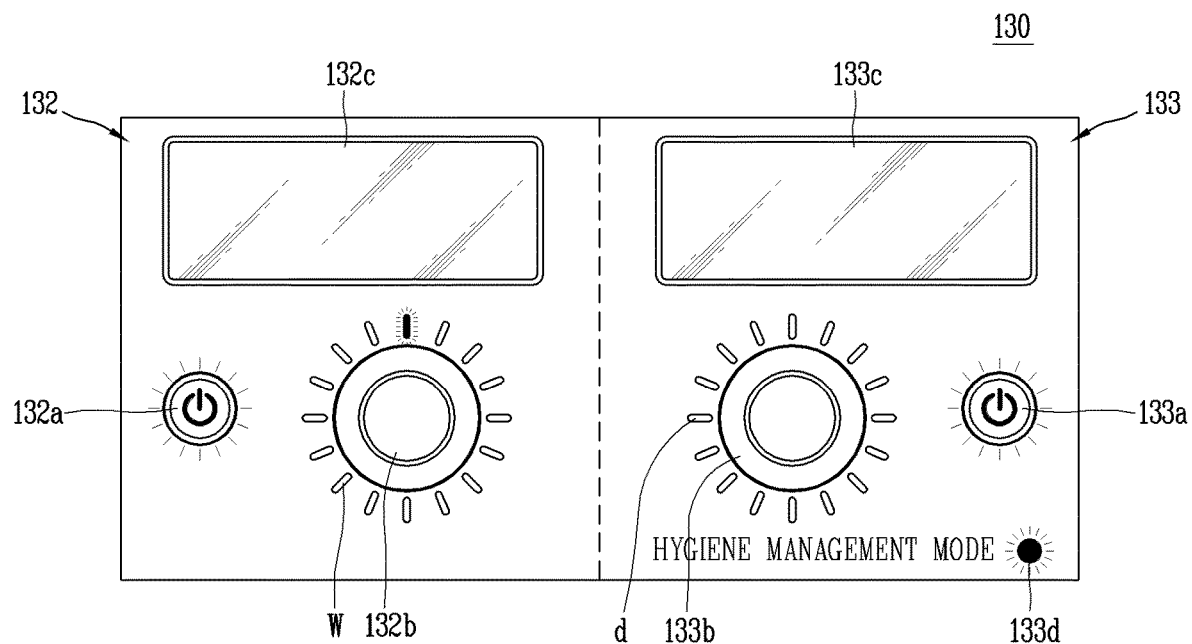
FIG. 7 is an exemplary view illustrating an operation unit when a hygiene management mode according to an implementation is set.

Upon the completion of the step S130, as illustrated in FIG. 7, the power supply 132a of the first operation module 132 of the operation unit 130 and one of the plurality of washing operations w may be selected, and an LED corresponding to the selected washing operation may be turned on. Then, the power supply 133a and the hygiene management mode notification LED 133d may be turned on in the second operation module 133.

According to a result of the selection of the synchronization or the non-synchronization in step S120, the drying unit 120 may perform a hygienic operation corresponding to a first scenario or a second scenario (S140).

Here, the hygienic operation may be an operation of sterilizing and washing the condenser and the drum of the drying unit 120. For example, the hygienic operation may include an operation of washing the condenser, an operation of drying the washed condenser, and an operation of sterilizing and drying the inside of the drum into which the laundry is introduced.

The first scenario may be a process in which the drying unit 120 performs the hygienic operation when the synchronization is selected in step S120, namely, a process in which a completion time of the washing operation and a completion time of the hygienic operation are synchronized with each other. In the first scenario, the hygienic operation may be completed earlier than the washing operation or the hygienic operation and the washing operation may be completely simultaneously.

On the other hand, the second scenario may be a process in which the drying unit 120 performs the hygienic operation when the non-synchronization is selected in step S120, namely, a process in which the completion time of the washing operation and the completion time of the hygienic operation are desynchronized from each other. In the second scenario, the washing operation and the hygienic operation may be executed separately.

Then, when a plurality of unexpected situations occurs in the washing unit 110, the drying unit 120 may perform a plurality of actions corresponding to the plurality of unexpected situations (S160). In some examples, the unexpected situations can include predefined events that occur in at least one of the washing unit 110 or the drying unit 120.

Here, the unexpected situation indicates a situation in which the operation of the washing unit 110 is suddenly stopped during operation, for example, may be a case where a factor affecting the operation of the washing unit 110 is involved, such as damage on a predetermined configuration or power-off.

Figure 8:
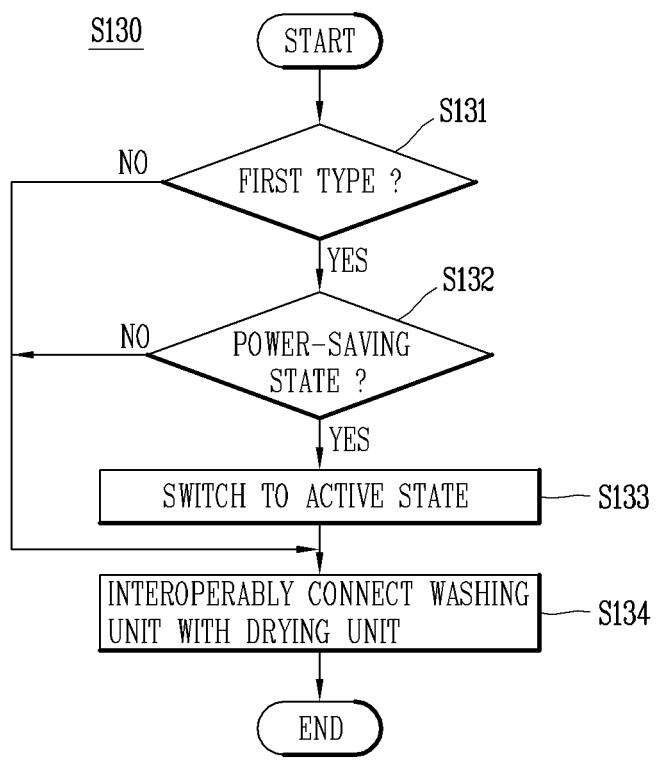
FIG. 8 is a flowchart illustrating a process in which a washing unit and a drying unit illustrated in FIG. 1 are interoperably connected with each other.

Thereinafter, the process in which the washing unit and the drying unit are interoperably connected with each other (S130) will be described with reference to FIG. 8.

First, it may be determined whether the drying unit 120 is a first type or a second type (S131).

The first type may indicate a type in which the drying unit 120 is switched from an active state into a power-saving state when a predetermined time elapses after power is applied to the drying unit 120, and the second type may indicate a type in which the drying unit 120 is maintained in the active state after power is applied to the drying unit 120.

In step S131, when the drying unit 120 is determined to be the first type, it may be determined whether the drying unit 120 is in a power-saving state (S132). When the drying unit 120 is determined to be in the power-saving state, then the drying unit 120 may be switched into the active state (S133). Thereafter, when the drying unit 120 is switched to the active state, the washing unit 110 and the drying unit 120 may be interoperably connected with each other (S134).

On the other hand, in step S131, when the drying unit 120 is determined to be the second type, the washing unit 110 and the drying unit 120 may immediately be interoperably connected with each other without performing those steps S132 and S133 (S134).

Figure 9:
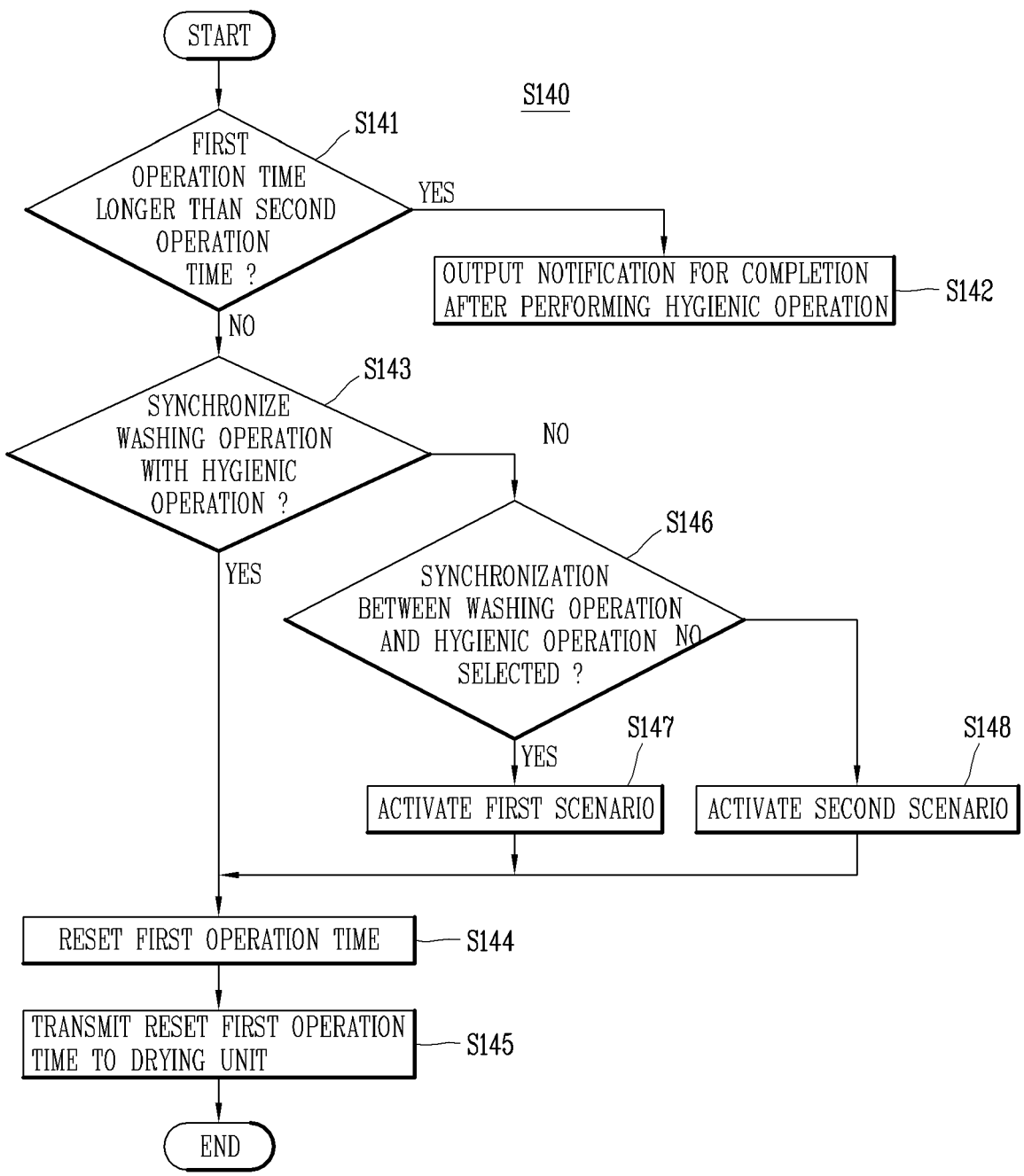
FIG. 9 is a flowchart illustrating a process in which the drying unit illustrated in FIG. 1 performs a hygienic operation.

Hereinafter, the process in which the drying unit performs the hygienic operation (S140) will be described in detail with reference to FIG. 9.

A first operation time of the washing operation performed by the washing unit 110 and a second operation time of the hygienic operation performed by the drying unit 120 may be compared with each other (S141).

In step S141, when the second operation time is shorter than the first operation time, the drying unit 120 may complete the hygienic operation, and then a notification for the completion of the hygienic operation may be output (S142).

Figure 10A:
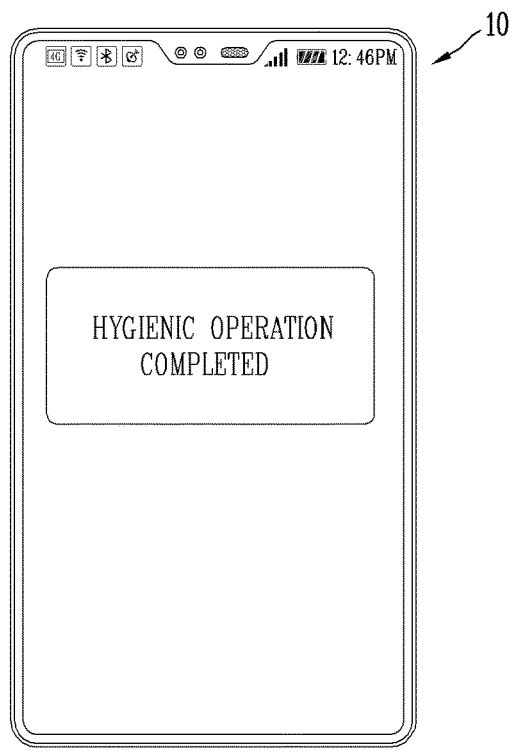
FIGS. 10A and 10B are exemplary views illustrating the hygienic operation illustrated in FIG. 9.

When the second operation time is shorter than the first operation time, since the hygienic operation of the drying unit 120 is completed earlier than the washing operation of the washing unit 110, the drying unit 120 can be used immediately after the washing operation is completed without requiring an additional setting. Therefore, when the hygienic operation of the drying unit 120 is completed, as illustrated in FIG. 10A, a notification for the completion of the hygienic operation may be output to the terminal 10.

On the other hand, when the first operation time is shorter than the second operation time in step S141, the selection result of step S120 may be determined (S143).

When the first operation time is shorter than the second operation time, the washing operation of the washing unit may be completed faster than the hygienic operation of the drying unit, and thereby the drying unit cannot be used immediately even after the washing operation is completed. Therefore, an additional process may be required to set the first operation time to be equal to or longer than the second operation time.

When the synchronization is selected in step S143, the first operation time may be reset to be equal to or longer than the second operation time (S144). The washing unit 110 may then transmit the reset first operation time to the drying unit 120 (S145). And, during step S145, the washing unit 110 may simultaneously perform the washing operation according to the first operation time.

On the other hand, when the non-synchronization is selected in step S143, a notification for selecting the synchronization or non-synchronization again with respect to the first operation time and the second operation time may be output (S146).

Then, when the synchronization is selected again in step S146, the first scenario may be activated in the drying unit (S147). On the other hand, when the non-synchronization is selected again, the second scenario may be activated in the drying unit (S148).

Figure 10B:
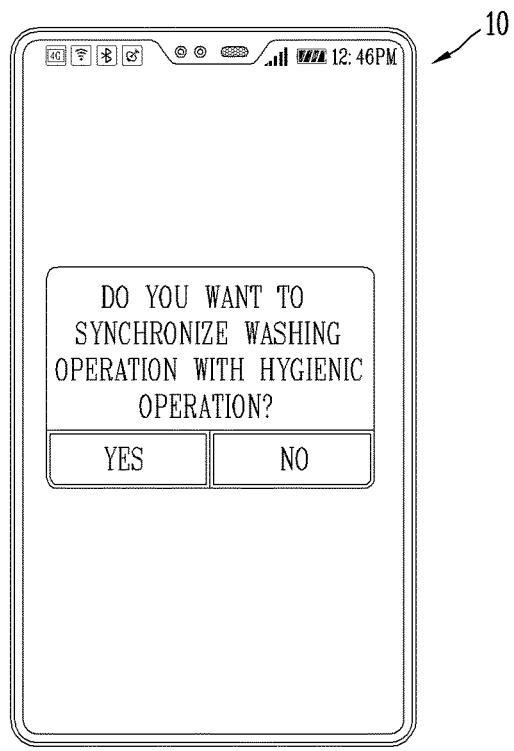

As illustrated in FIG. 10B, in step S146, a notification for selecting the synchronization or non-synchronization again may be output to the terminal 10, and the user may select the synchronization or non-synchronization again.

Figure 11:
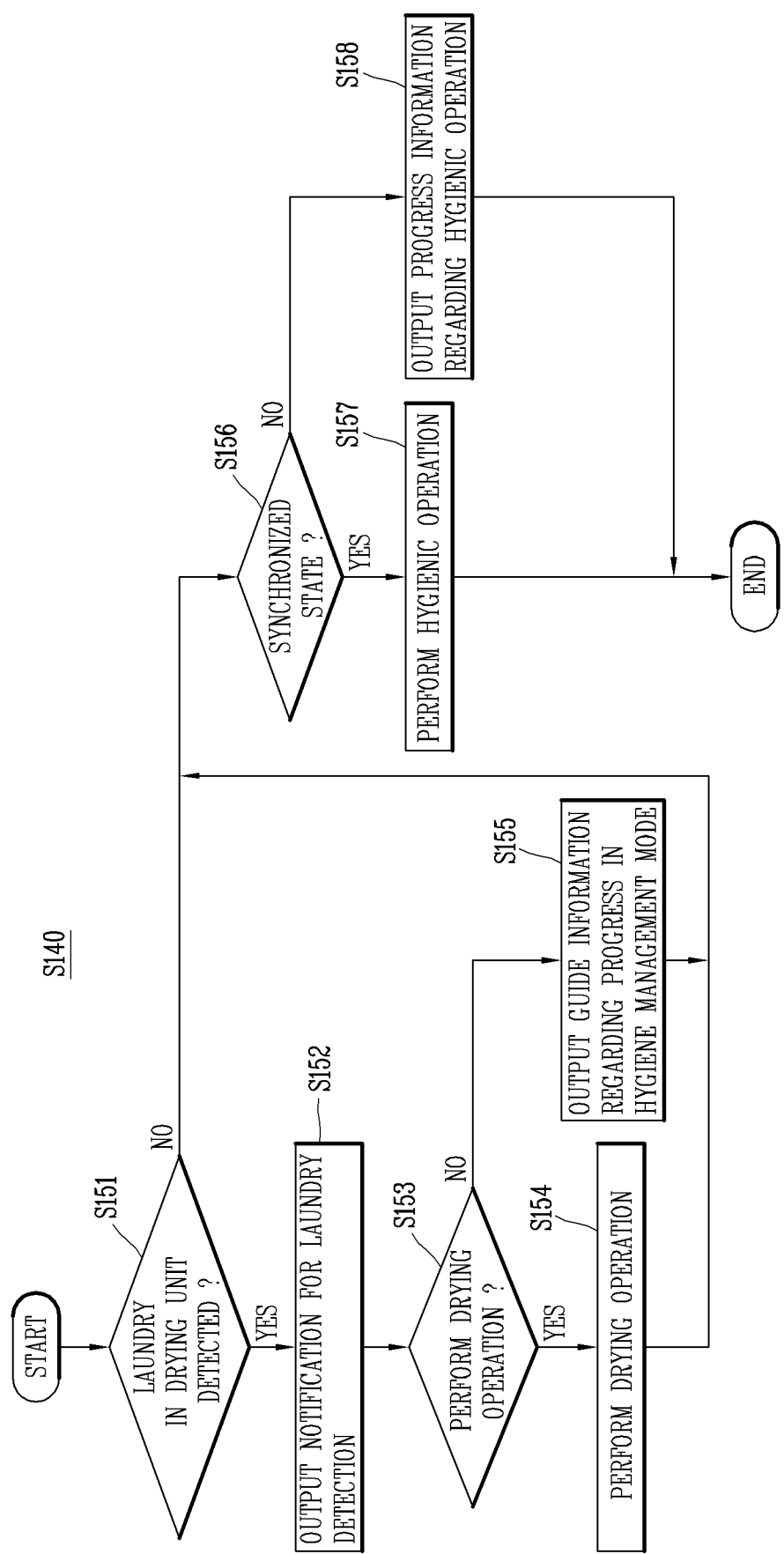
FIG. 11 is a flowchart illustrating a process in which the drying unit illustrated in FIG. 1 performs a hygienic operation.

Hereinafter, the process in which the drying unit performs the hygienic operation after the process illustrated in FIG. 9 (S140) will be described with reference to FIG. 11.

After transferring the reset first operation time to the drying unit 120 (S145), the drying unit 120 may detect the laundry inside the drum (S151).

When the laundry is detected in step S151, information related to the detection of the laundry may be output as a notification (S152).

Then, a notification for selecting whether to perform the drying operation of the drying unit 120 for the laundry may be output to the terminal 10 (S153).

Figure 12A:
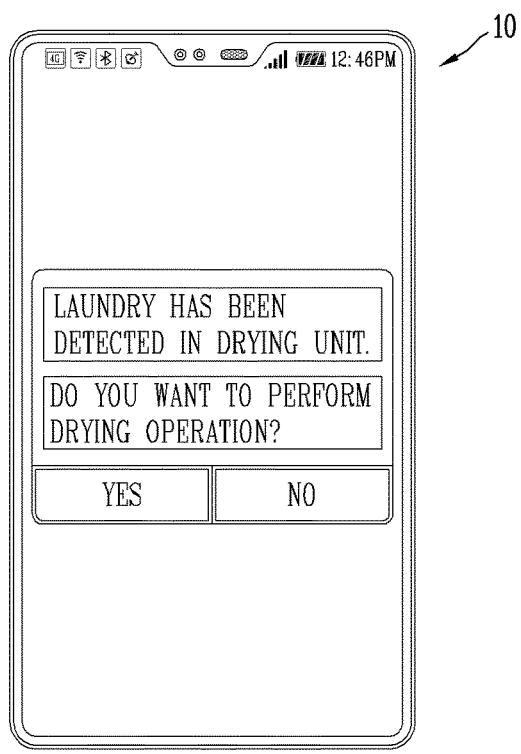
FIGS. 12A to 12C are exemplary views illustrating a process of performing the hygienic operation illustrated in FIG. 11.

Hereinafter, those steps S152 and S153 will be described in more detail. When the laundry is detected in step S152, as illustrated in FIG. 12A, information related to the detection of the laundry may be output to the terminal 10 as a notification, and simultaneously a notification for selecting whether to perform the drying operation of the drying unit 120 for the detected laundry may be output.

When it is selected to perform the drying operation in step S153, the drying operation may be performed (S154). On the other hand, when it is selected not to perform the drying operation in step S153, guide information related to conditions for proceeding with the hygiene management mode may be output as a notification (S155).

Figure 12B:
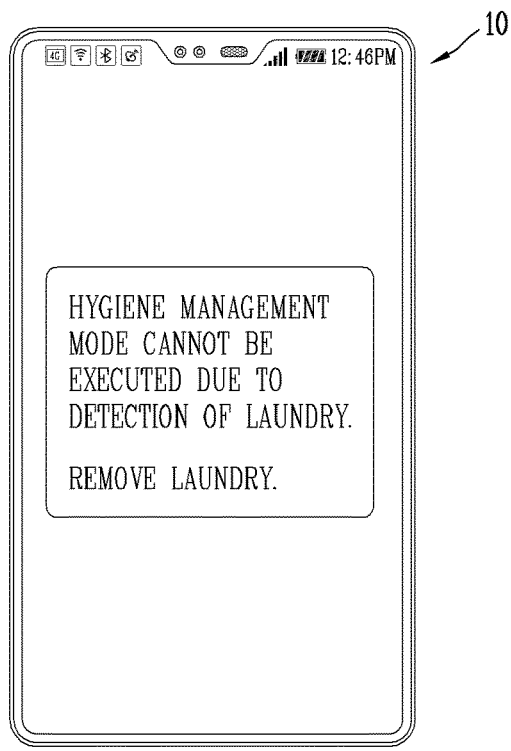

Hereinafter, the step S155 will be described in more detail. Since the hygiene management mode of the implementation cannot be performed when the laundry is detected inside the drying unit, as illustrated in FIG. 12B, a notification for the detection of the laundry inside the drying unit 120 and a notification that the laundry should be removed may be output simultaneously. In addition, when the laundry is removed from the drying unit 120 and is not detected any more, the notification may be stopped.

On the other hand, when the laundry is not detected in step S151, when the drying operation of the drying unit 120 is completed in step S154, or when the laundry inside the drying unit 120 is removed in step S155, the selection result of step S146 may be determined (S156).

When it is determined that the synchronization has been selected in step S156, the drying unit 120 may perform the hygienic operation corresponding to the first scenario (S157). On the other hand, when it is determined that the non-synchronization is selected in S156, the drying unit 120 may perform the hygienic operation corresponding to the second scenario and simultaneously output progress information related to the hygienic operation (S158).

Figure 12C:
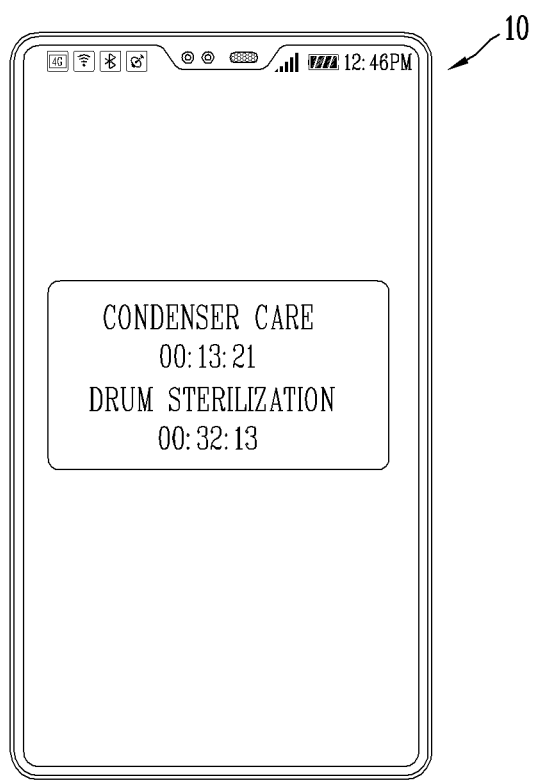

The progress information related to the hygienic operation may include a progress of the operation being performed and a remaining time. In step S158, as illustrated in FIG. 12C, the progress of the hygienic operation being performed and the remaining time may be output to the terminal 10.

In the second scenario, since the washing operation of the washing unit 110 and the hygienic operation of the drying unit are separately performed, the user can recognize progress information related to the hygiene management mode of the drying unit 120 through the notification output to the terminal 10.

Hereinafter, the process in which the drying unit performs the plurality of actions (S160) will be described with reference to FIG. 13.

When a failure occurs in the washing unit 110 during operation, it may be determined whether the drying unit 120 is performing the hygienic operation (S161).

In step S161, when the drying unit 110 is not performing the hygienic operation, the drying unit 120 may be maintained in its current state (S162).

In step S161, when it is determined that the drying unit 120 is performing the hygienic operation, it may be determined whether the drying unit 120 is performing a first operation included in the hygienic operation (S163). When it is determined that the drying unit 120 is performing the first operation, the drying unit 120 may complete the first operation and thereafter start to perform a third operation (S164).

When it is determined in step S163 that the drying unit 120 is not performing the first operation, it may be determined whether the drying unit 120 is performing a second operation (S165). When it is determined that the drying unit 120 is not performing the second operation, the drying unit 120 may perform the third operation (S164).

On the other hand, when it is determined in step S165 that the drying unit 120 is performing the second operation, the drying unit 120 may output a notification for selecting whether to keep performing or stop the second operation (S166).

When it is selected in step S166 that the drying unit 120 keeps performing the second operation, the drying unit may keep performing the second operation until the second operation is completed (S167). On the other hand, when it is selected in step S166 that the drying unit 120 stops the second operation, the drying unit 120 may complete the currently-performed second operation and then the washing unit 110 may drain out residual water (S168).

The hygienic operation may include a first operation, a second operation, and a third operation. The first operation may be an operation of sterilizing the inside of the drum of the drying unit 120 using hot air, the second operation may be an operation of sterilizing the inside of the drum by blowing air, and the third operation may be an operation of caring the condenser, such as washing the condenser. However, the first to third operations are not limited thereto, and may correspond to all operations capable of managing the hygiene of the configuration for performing the operation of drying the laundry in the drying unit 120.

Figure 14A:
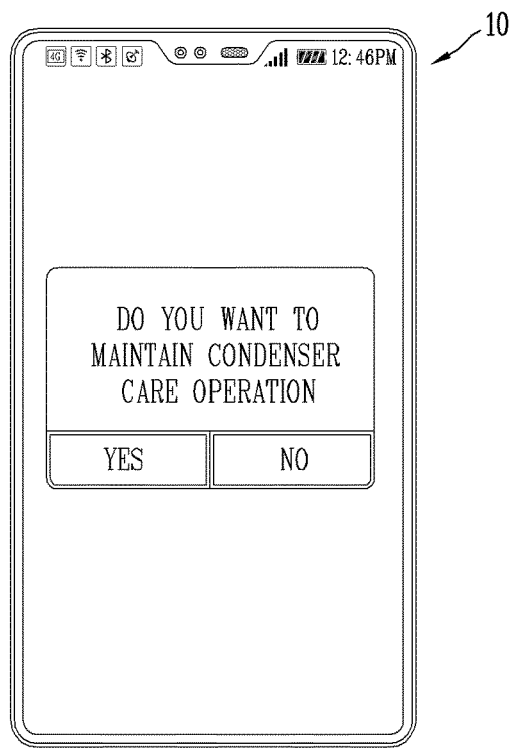
FIGS. 14A to 14C are exemplary views illustrating a process of performing a plurality of actions illustrated in FIG. 13.
Figure 14B:
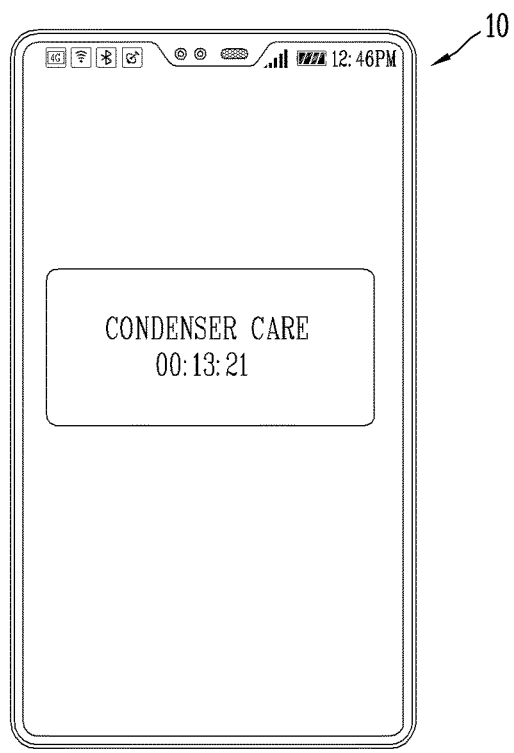

Hereinafter, those steps S166, S167, and S168 will be described as examples of the first to third operations. In step S166, a notification for selecting whether to maintain or stop a condenser care operation of the drying unit 120 may be output to the terminal 10, as illustrated in FIG. 14A. When it is selected to maintain the condenser care operation, a remaining time of the operation may be output, as illustrated in FIG. 14B, while performing the condenser care operation.

Figure 14C:

On the other hand, when it is selected not to maintain the condenser care operation, the condenser care operation may be stopped and guide information for starting drainage of the washing unit may be output as illustrated in FIG. 14C.

Although specific implementations of the present disclosure have been described so far, various modifications are possible without departing from the scope of the present disclosure. Therefore, the scope of the present disclosure should not be limited to the described implementations, but should be determined not only by the claims below, but also by the equivalents of the claims.

What is claimed is:

1. A method for controlling a laundry management apparatus including a washer and a dryer, the method comprising: performing a washing operation by the washer; while the washing operation is performed by the washer, performing a hygienic operation by the dryer before performing a drying operation by the dryer, wherein the hygienic operation comprises washing and drying a condenser of the dryer; and synchronizing the washing operation of the washer and the hygienic operation of the dryer such that the hygienic operation is completed on or before a completion time of the washing operation wherein performing the hygienic operation comprises: based on a first operation time of the washing operation being less than a second operation time of the hygienic operation, resetting the first operation time to be greater than or equal to the second operation time or resetting the second operation time to be less than or equal to the first operation time to thereby terminate the hygienic operation of the dryer on or before terminating the washing operation of the washer.

2. The method of claim 1, wherein the hygienic operation further comprises heating and supplying air into a drum of the dryer, the drum being configured to receive laundry.

3. The method of claim 1, wherein the washing operation of the washer is performed according to the first operation time that is reset to be greater than or equal to the second operation time.

4. The method of claim 3, further comprising transmitting the first operation time to the dryer after resetting the first operation time.

5. The method of claim 4, wherein performing the hygienic operation further comprises:
after transmitting the first operation time to the dryer and based on the laundry being present in the dryer, outputting a notification indicating the presence of the laundry;
outputting a notification for selecting whether to perform the drying operation of the dryer for drying the laundry; and
performing the drying operation based on a selection to perform the drying operation.

6. The method of claim 5, wherein performing the hygienic operation further comprises:
outputting a notification including guide information regarding whether to proceed with the hygienic operation of the dryer based on a selection not to perform the drying operation.

7. The method of claim 5, wherein performing the hygienic operation further comprises:
based on detecting no laundry in the dryer, performing a first scenario hygienic operation or a second scenario hygienic operation according to a selection of one of a synchronization operation or a non-synchronization operation,
wherein performing the first scenario hygienic operation or the second scenario hygienic operation comprises:
outputting a notification including progress information related to the second scenario hygienic operation while performing the second scenario hygienic operation.

8. The method of claim 1, further comprising:
performing a plurality of actions based on the washer stopping during the hygienic operation,
wherein the hygienic operation comprises (i) a first operation comprising heating and supplying air into a drum of the dryer, (ii) a second operation comprising drying the condenser of the dryer, and (ii) a third operation comprising washing the condenser of the dryer, and
wherein performing the plurality of actions further comprises:
determining whether the dryer is performing the first operation included in the hygienic operation; and
performing, by the dryer, the third operation included in the hygienic operation after completing the first operation based on the first operation being performed.

9. The method of claim 8, wherein performing the plurality of actions further comprises:
determining whether the dryer is performing the second operation included in the hygienic operation based on the first operation not being performed.

10. The method of claim 9, wherein performing the plurality of actions comprises performing the third operation based on the second operation not being performed.

11. The method of claim 10, wherein performing the plurality of actions further comprises:
based on determining that the second operation is being performed, outputting a notification for selecting whether to keep performing the second operation; and
maintaining performance of the second operation based on a selection to keep performing the second operation.

12. The method of claim 11, wherein performing the plurality of actions further comprises:
stopping the second operation, and draining residual water within the washer based on a selection not to keep performing the second operation.

13. The method of claim 1, further comprising:
operably connecting the washer and the dryer to each other based on a type of the dryer among a first type dryer or a second type dryer, wherein the first type dryer is configured to switch from an active state to a power-saving state based on an elapse of a predetermined time after power is applied to the first type dryer, and the second type dryer is configured to maintain the active state after power is applied to the second type dryer.

14. The method of claim 13, wherein operably connecting the washer and the dryer to each other further comprises:
determining whether the dryer is in the power-saving state based on determining that the dryer is the first type dryer, and
switching the dryer to the active state based on the dryer being in the power-saving state.

15. The method of claim 14, wherein operably connecting the washer and the dryer to each other comprises:
operably connecting the washer and the dryer to each other based on the dryer not being in the power-saving state.

16. The method of claim 14, wherein operably connecting the washer and the dryer to each other comprises:
operably connecting the washer and the dryer to each other based on the dryer being the second type dryer.

17. The method of claim 1, further comprising:
receiving input from a user for setting a hygiene management mode of the dryer; and
performing the hygienic operation based on receiving the input from the user for setting the hygiene management mode.

* * * * *